US008424258B2

(12) United States Patent
Modica et al.

(10) Patent No.: US 8,424,258 B2
(45) Date of Patent: Apr. 23, 2013

(54) MODULAR ROOF, DECK AND PATIO APPARATUS, INCLUDING MODULAR PANELS WITH SNAP CONNECTION FEATURES

(75) Inventors: Chuck Modica, Elmhurst, IL (US); Anthony Modica, New Baltimore, MI (US)

(73) Assignees: Charles F. Modica, Chicago, IL (US); Anthony C. Modica, Buffalo, NY (US)

( * ) Notice: Subject to any disclaimer, the term of this patent is extended or adjusted under 35 U.S.C. 154(b) by 408 days.

(21) Appl. No.: 12/807,411

(22) Filed: Sep. 4, 2010

(65) Prior Publication Data

US 2011/0067325 A1 Mar. 24, 2011

Related U.S. Application Data (60) Provisional application No. 61/276,105, filed on Sep. 8, 2009.

(51) Int. Cl.
*E04B 2/44* (2006.01)
*E04B 2/08* (2006.01)

(52) U.S. Cl.
USPC ............... 52/285.4; 52/286; 52/284; 47/66.5; 47/86; 446/105; 446/106; 446/114

(58) Field of Classification Search ................ 52/285.1, 52/279, 281, 282.2, 284, 285.4, 286; 47/66.5, 47/86, 66.1; 446/105, 106, 112, 114, 115, 446/118, 85
See application file for complete search history.

(56) References Cited

U.S. PATENT DOCUMENTS

| | | | | | |
|---|---|---|---|---|---|
| 2,110,990 | A | * | 3/1938 | Forbes | 446/106 |
| 2,204,319 | A | * | 6/1940 | Parsons et al. | 446/112 |
| 2,219,870 | A | * | 10/1940 | Jacobus | 47/86 |
| 4,212,134 | A | * | 7/1980 | Brokamp | 47/82 |
| 5,862,629 | A | * | 1/1999 | Sulyman | 47/66.1 |
| 5,924,905 | A | * | 7/1999 | Cyrus et al. | 446/118 |
| 5,951,356 | A | * | 9/1999 | Cyrus et al. | 446/118 |
| 6,004,182 | A | * | 12/1999 | Pasin | 446/105 |
| 6,493,995 | B2 | * | 12/2002 | McKenzie | 52/36.4 |
| 6,681,522 | B2 | * | 1/2004 | Marchioro | 47/65.5 |
| 6,711,860 | B2 | * | 3/2004 | Fleishman | 52/81.3 |
| 6,892,497 | B2 | * | 5/2005 | Moon et al. | 52/79.1 |
| 7,021,009 | B2 | * | 4/2006 | Johnson | 52/79.5 |
| 7,395,634 | B2 | * | 7/2008 | Anderson et al. | 52/79.1 |
| 7,493,731 | B2 | * | 2/2009 | Zhang | 52/270 |
| 7,581,357 | B2 | * | 9/2009 | Richardson et al. | 52/79.5 |
| 7,596,906 | B2 | * | 10/2009 | Gold | 47/65.9 |
| 7,832,147 | B2 | * | 11/2010 | Weast | 47/86 |
| 8,001,731 | B2 | * | 8/2011 | Huxel | 52/79.9 |
| 8,105,127 | B2 | * | 1/2012 | Heston | 446/85 |
| 8,215,059 | B2 | * | 7/2012 | Williams | 47/86 |
| 8,272,163 | B2 | * | 9/2012 | Dubner | 47/65.9 |
| 2002/0005012 | A1 | * | 1/2002 | Cochran | 47/66.5 |
| 2002/0007593 | A1 | * | 1/2002 | Mischo | 47/86 |
| 2004/0198141 | A1 | * | 10/2004 | Buhrman et al. | 446/85 |

* cited by examiner

*Primary Examiner* — Phi Dieu Tran A
(74) *Attorney, Agent, or Firm* — Charles Modica; Anthony Modica (57) ABSTRACT

The present invention relates generally to green roof, deck and patio apparatuses, also known as roof, deck and patio landscaping apparatuses and roof, deck and patio gardens, that are suitable for supporting live plant growth on building decks, rooftop and patio surfaces.

12 Claims, 11 Drawing Sheets

MODULAR ROOF, DECK AND PATIO APPARATUS, INCLUDING MODULAR PANELS WITH SNAP CONNECTION FEATURES

CROSS-REFERENCES TO RELATED APPLICATIONS

This application claims the benefit of U.S. Provisional Patent Application Ser. No. 61276105, filed on Sep. 8, 2009.

FIELD OF THE INVENTION

The present invention relates generally to modular roof, deck and patio apparatuses, also known as roof, deck and patio landscaping apparatuses and roof, deck and patio gardens, that are suitable for supporting live plant growth on building decks, rooftop and patio surfaces.

More particularly, the invention relates to modular roof, deck and patio apparatuses and methods for use therewith.

BACKGROUND OF THE INVENTION

Prior green roof, deck and patio apparatuses typically comprise several layers of materials suitable to support vegetation on a roof, deck or patio surface. These layers are typically supplied in bulk or earthen rolls that are rolled into position on the roof, deck or patio surface.

Common types of vegetation used in green rooftop, deck and patio apparatuses include herbs, grasses, vegetables, mosses, wild plants and flowers, and other types of perennials.

A typical prior green roof, deck and patio apparatus includes built in place structures on the roof, deck or patio surface, making them complex and expensive to install. Most prior green roof, deck and patio apparatuses consist of four basic components: a waterproofing layer, a drainage layer, a growing medium, and vegetation. Some green roof, deck and patio apparatuses also include root retention and irrigation apparatuses, additional layers of various materials for various surface protection and vegetation growth support purposes, but these are not essential.

Other green roof, deck and patio designs include basic garden boxes or planters which are difficult to move, have no modularity, and are individual systems which cannot be connected to create a larger gardening apparatus.

It is believed that prior green roof, deck and patio apparatuses of the above general type were first used in Europe approximately in the 1970s. Since that time, use of similar and derivative green roof, deck and patio apparatuses have become common in many parts of Europe on commercial, institutional, industrial, and residential buildings, and interest in green roof, deck and patio apparatuses is growing in the United States.

The advantages typically attributed to green roof, deck or patio apparatuses include extending the roof, deck or patio surface life; reducing heating and cooling energy costs; conserving and utilizing valuable commercial or residential space; reducing runoff from roof, deck or patio surfaces; and increasing property values.

However, inspection of prior green roof, deck and patio apparatuses also reveal the following disadvantages:

the prior apparatuses are relatively expensive and are difficult to install, typically requiring the need for and assistance of a specially trained consultant;

the apparatuses are not designed to be installed over an existing functional roof, deck or patio surface without the necessity of pre-treating the roof, deck or patio surface;

thus, a complete new waterproofing membrane must typically be installed before the apparatus can be used on existing surfaces, resulting in additional costs;

since the materials are delivered in bulk or earthen rolls, design freedom is limited, alternating the design layout after installation requires removal and destruction of the effected area and replanting with the new design;

terracing or variations of surfaces are also not easily accomplished; and changing of the design layout after installation requires removal and destruction of the effected area and replanting with the new design;

selection of pre-grown plants available is typically limited because: the need to maintain the plants in the growing state prior to shipment results in additional costs; the demand must be estimated in advance of the installation season in order to have the pre-grown plants ready; and such estimates are typically conservative in order to prevent overstocking and spoilage if not used during that season; and maintenance and repair to the roof, deck or patio surface is difficult and expensive if a leak develops in the roof, deck or patio membrane, or if other maintenance or repair is required, the entire green roof, deck or patio apparatus, or at least large portions of the green roof, deck or patio apparatus, must be removed to locate and repair the leak or accomplish the desired maintenance;

the removed green roof, deck or patio apparatus must then be replaced and replanted.

Thus, it is clear there is a need for new and improved green roof, deck and patio apparatuses which:

are less expensive and more easily installed and more lightweight than prior green roof, deck and patio apparatuses;

can be installed over existing roofing, decking or patio materials on existing buildings, thus eliminating the need and associated cost to install completely new roofing, decking or patio membranes or pre-treatment apparatuses prior to installation of the green roof, deck and patio apparatus;

provide for substantially enhanced design flexibility and freedom, including;

the ability to change the design layout of the green roof, deck or patio apparatus after initial installation;

to enable repair of a prior green roof, deck or patio apparatus such as when a portion of the prior green roof, deck and patio apparatus has been removed for repairs of the building roof, deck or patio surface, to eliminate the current need to re-install the entire prior green roof, deck and patio apparatus after such removals or repairs; and permit ease of access to desired portions of the roof, deck or patio surface for maintenance and repair without the need to destroy and then replace large portions of the green roof, deck and patio apparatus.

SUMMARY OF THE INVENTION

The general aim of the present invention is to provide a new and improved green roof, deck and patio apparatus to address the above identified disadvantages of prior green roof, deck and patio apparatuses and achieve the advantages and benefits flowing from addressing the above-identified needs thereof.

More particularly, it is an objective of the invention to provide a modular green roof, deck and patio apparatus comprising modular panels having a surrounding space suitable for supporting live plant growth and adapted for installing onto an existing roof, deck or patio surface in side-by-side, "L" shaped, "T" shaped, "+" shaped, or "U" shaped positioning while allowing water flow on the roof, deck or patio surface thereunder. The panels are installed with growing medium and greenery, and are releasably connected with snap-on connection features and support structure to enable provision of non-panel areas of the green roof, deck and patio apparatus, support of the panels, and above-panel structures, including structures adapted to assist in lifting and positioning the panels into place on the roof, deck or patio surface, or for removing the panels from the roof, deck or patio surface. The panels are installed in a non-progressive manner that permits removal of a surrounded panel without disturbing the adjacent panels, thus providing for ease of repair of the roof structure by simply removing the necessary panels.

The modular panels of the invention are more easily installed than prior green roof, deck and patio apparatuses, and the panels are lightweight and portable and can be more easily lifted for easier installation and for roof, deck or patio surface repair without the need to destroy a substantial portion of the installed green roof, deck and patio apparatus as with prior green roof, deck and patio apparatuses. Additionally, the panels may be connected with snap-on male/female features without the need for tools for easier installation. The modular panels enhance design-layout flexibility by enabling provision of a greater selection of growing materials for the green roof, deck and patio apparatus without concern for spoilage, enabling the growing materials to include those requiring greater solid depth than is available in prior green roof apparatuses, and enabling the panels to be rearranged after installed. Moreover, the panels may be filled with growing soil composition for optimal growth potential for a variety of vegetation, such as herbs, grasses, mosses, wild plants and flowers, and other types of perennials.

DETAILED DESCRIPTION OF THE INVENTION

Brief Description of the Modular Design Roof Deck and Patio Apparatus

The present invention relates to a modular design roof, deck and patio apparatus that is uniquely adapted to provide versatility of design with a broad range of design layout possibilities, while simultaneously providing for ease of installation and maintenance, and repairs to the underlying surface or structure of the building.

The roof, deck or patio apparatus of the present invention includes modular pans or containers herein generally referred to as a "base" and walls referred to as "modular panels" adapted to provide green areas on the roof, deck or patio surface, and inter-locking mechanisms to define boundaries of the rood, deck or patio areas of the modular panels. Preferred systems include interconnecting panels to provide additional design flexibility. Certain associated apparatus is also provided for ease of maintenance and repair of the underlying roof, deck or patio structure and replacement of the modular panels, and to provide for design freedom and ease of installation, maintenance and repairs.

Figure 1:
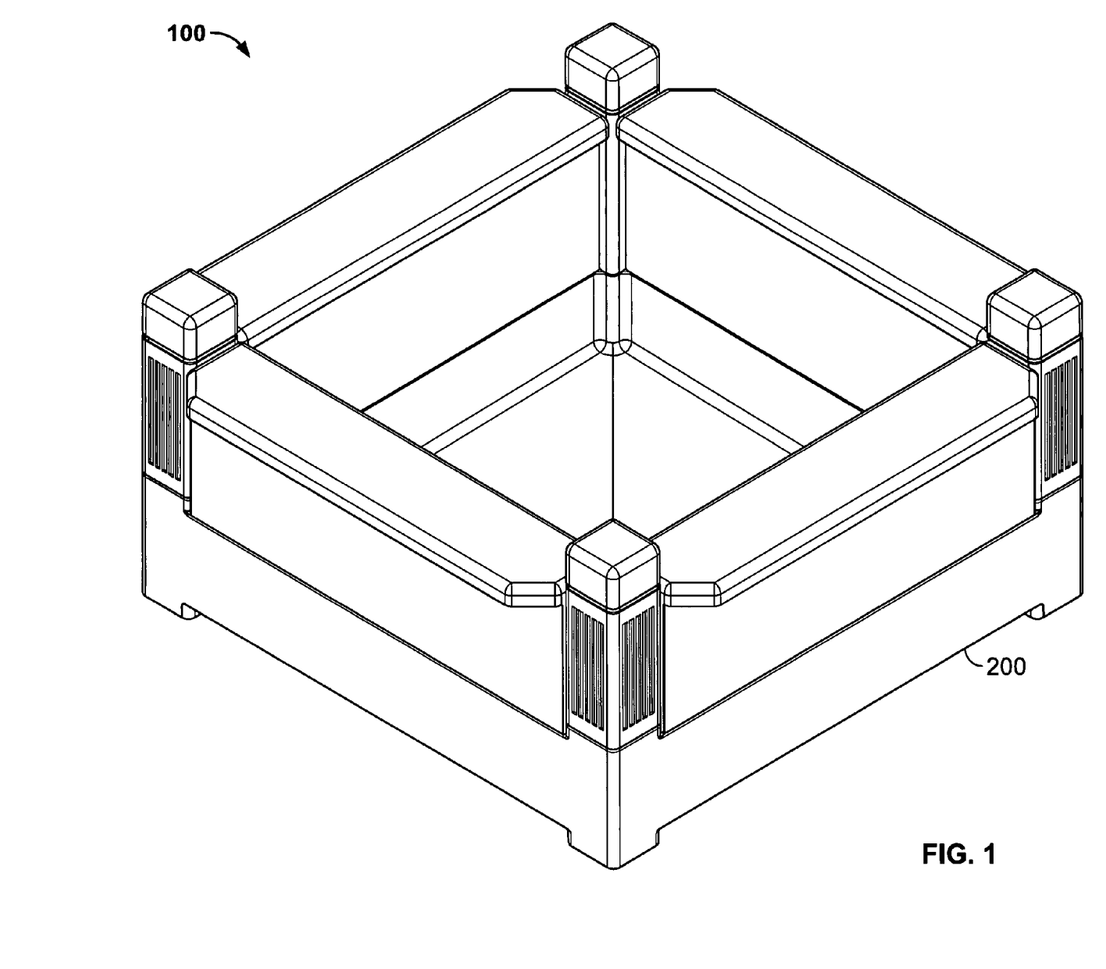
FIG. 1 is a full perspective view of a modular green roof, deck and patio apparatus in accordance with and incorporating the unique aspects of the present invention.

As illustrated in FIG. 1, the modular-design green roof, deck and patio apparatus 100 is uniquely adapted to provide versatility of design with a broad range of design layout possibilities, while simultaneously providing for ease of installation without tools, is maintenance-free, has easy portability, and is repair-free both to the green roof, deck and patio apparatus 100 and the underlying roof, deck and patio surface of the building on which the green roof, deck and patio apparatus 100 is installed.

Figure 2:
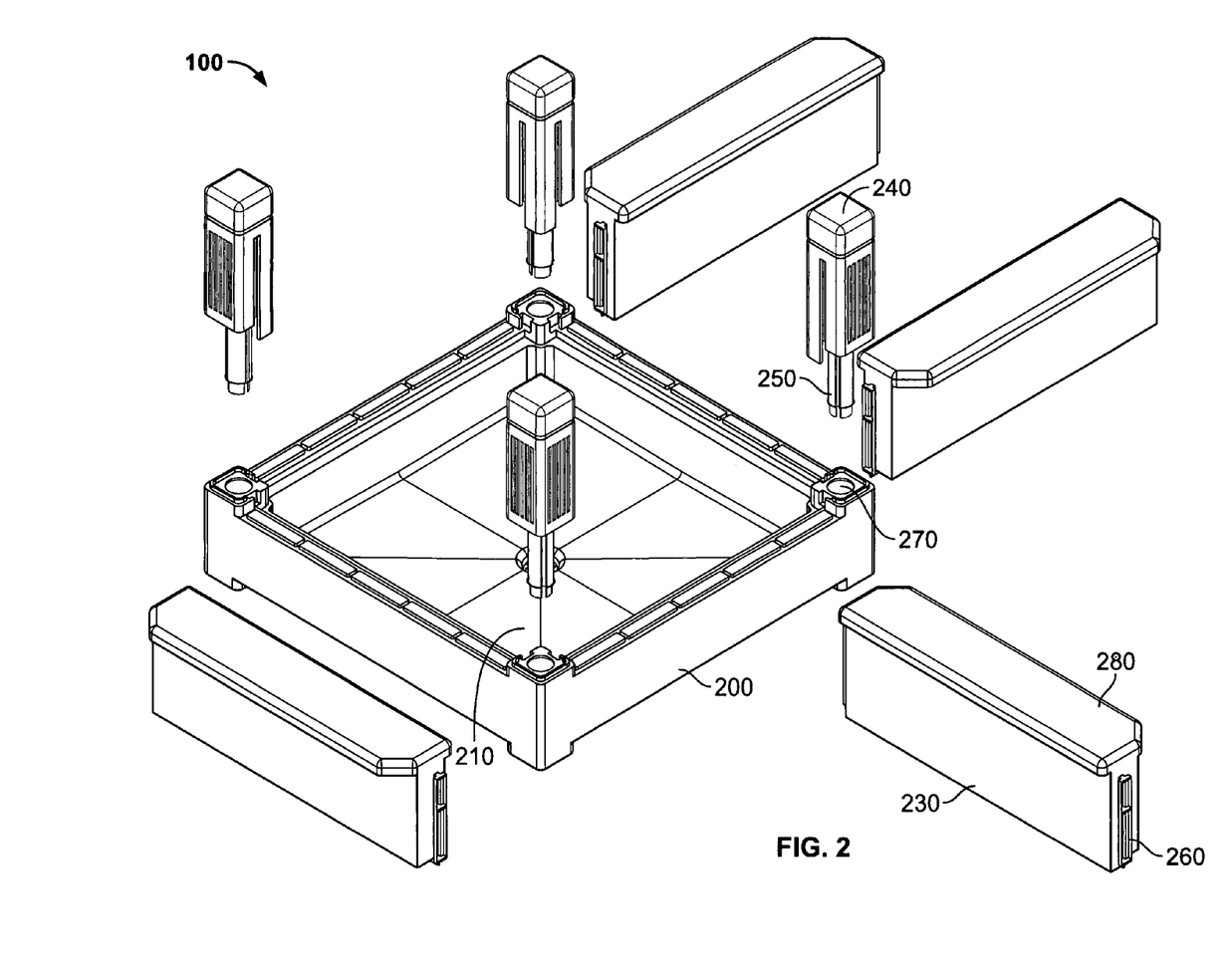
FIG. 2 is a full diagrammatic view of a modular green roof, deck and patio apparatus showing each individual component in accordance with and incorporating the unique aspect of the present invention.

As illustrated in FIG. 2, the green roof, deck and patio apparatuses 100 of the present invention includes modular panels 230 adapted to be connected to a base 200 to provide green areas on the roof, deck or patio surface of a building. The base 200 and modular panels 230 are arranged on a roof, deck or patio surface in a desired aesthetic design layout such as illustrated in FIGS. 7-11. The base 200 and panels 230 can be of different heights and depth and may be used to plant with various foliage or perennials and provide for various green areas for a desired visual effect. The base 200 are interlocking with adjacent base 200 without the use of tools in a non-progressive manner, to provide a stable, and wind resistant green roof, deck or patio apparatus 100 while simultaneously providing for ease of replacement of both the base 200 and the modular panels 230.

Base and Modular Panels

As illustrated in FIG. 1, in one aspect of the invention the base 200 and modular panels 230 are adapted for filling with a growing medium and supporting plant life, and are suitable for placing directly onto a roof, deck or patio surface in a modular green roof, deck and patio apparatus 100.

One embodiment of a base 200 and modular panel 230 suitable for use in accordance with the present invention are the base 200 and the panel 230 shown in detail in FIG. 2.

Figure 3:
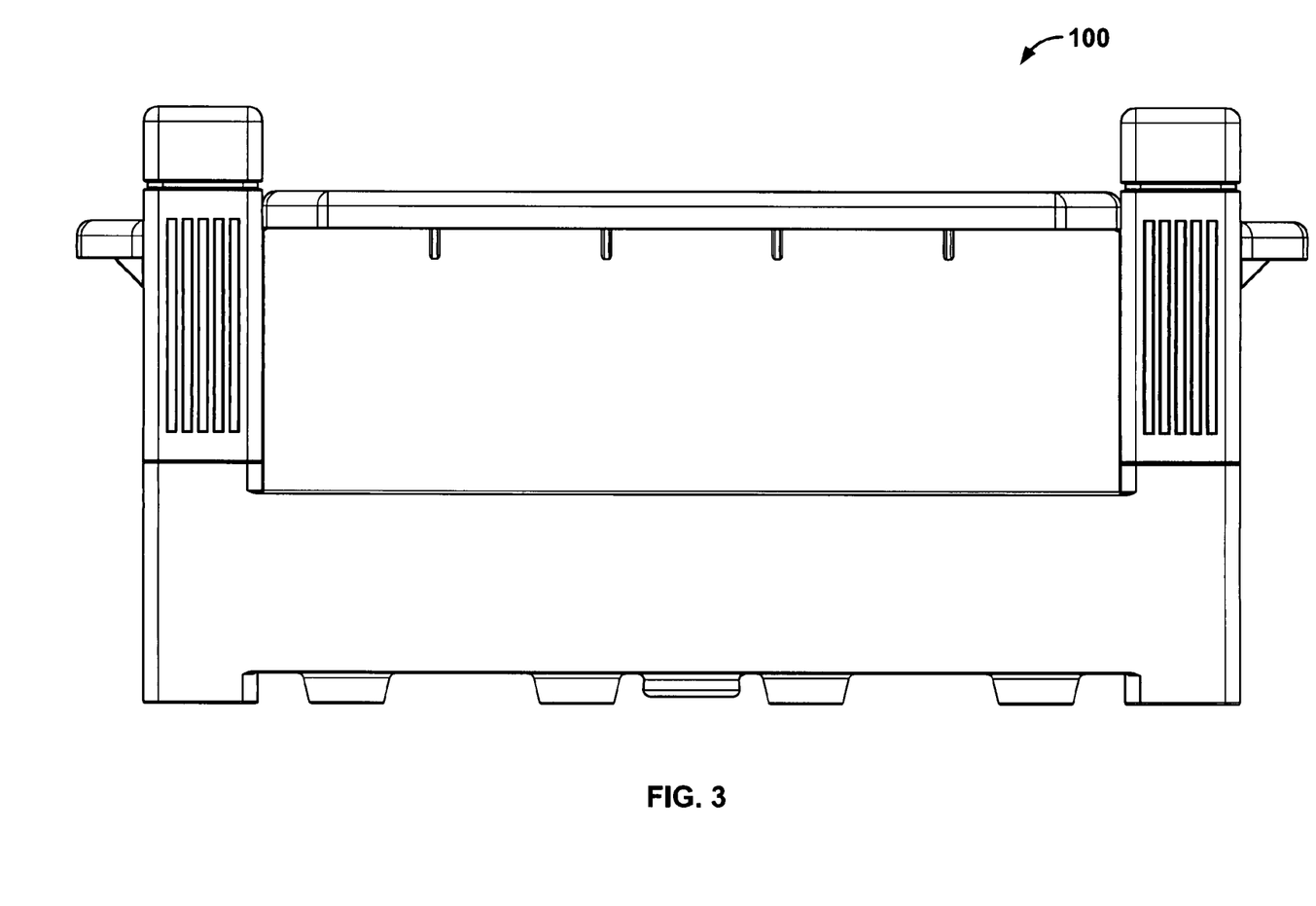
FIG. 3 is a perspective side view of a modular green roof, deck and patio apparatus in accordance with and incorporating the unique aspects of the present invention.

In this instance, the base 200 and panels 230 are formed in modular sizes that are lightweight and convenient for handling and are made of plastic and/or plastic composite. The material used is suitable to achieve cost effective manufacture, sufficient strength and rigidity for the panel size, and a desired durability and long life. Moreover, both the base 200 and the panels 230 are properly sized to fit into an average sized car for easy transportation and handling. The preferred shape of the base 200 is generally rectangular as illustrated in a side view in FIG. 3 so that the base 200 and the panels 230 cooperate with each other to generally cover the roof, deck or patio surface when viewed from above as illustrated in FIG. 4.

The side of the base 200 shown are formed with reinforcing ribs 220 (see FIG. 2) to achieve additional strength and rigidity and for a connection means to connect with the panels 230.

Figure 4:
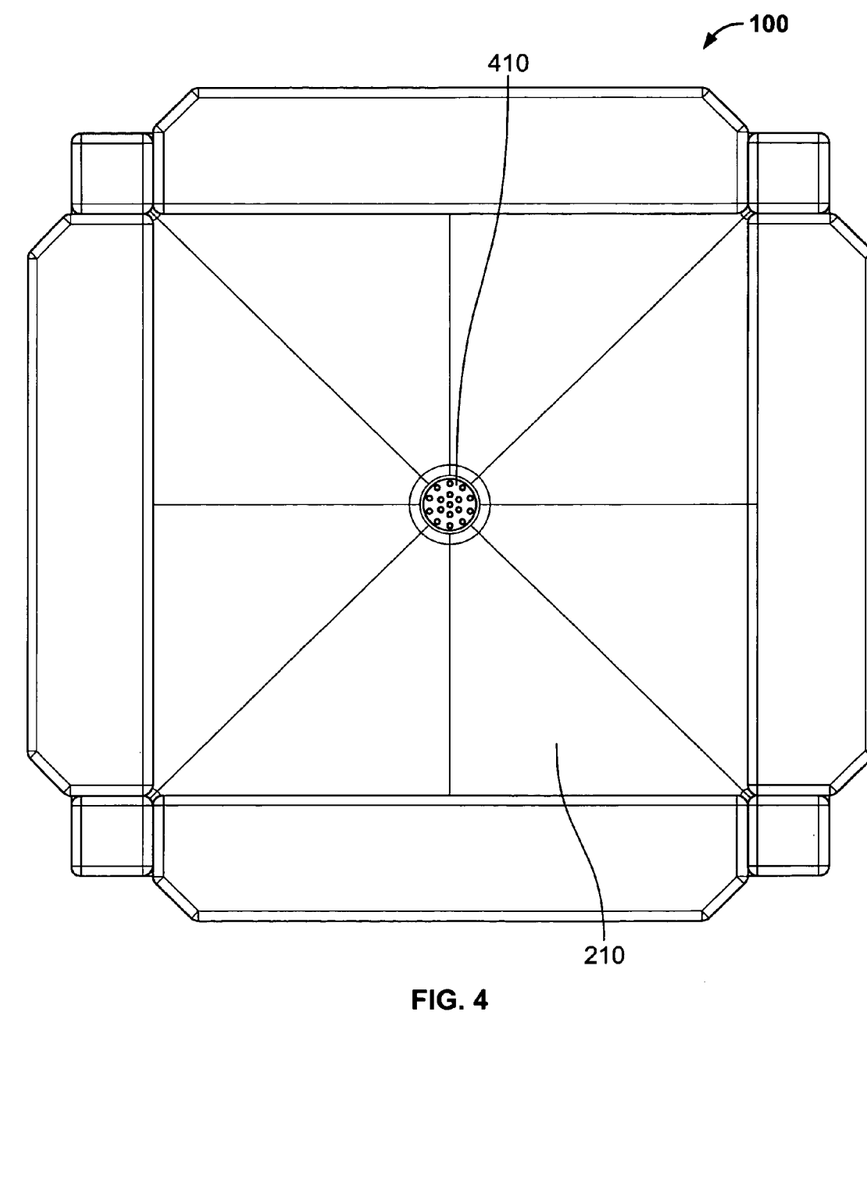
FIG. 4 is a top perspective view of a modular green roof, deck and patio apparatus in accordance with and incorporating the unique aspects of the present invention.

As illustrated in FIGS. 2 and 4, in accordance with one aspect of the invention, the base 200 is provided to be connected to the underside of the modular panels 230 (not shown) through a snap connection means by fitting the ribs 220 of the base into the open slot on the underside of the modular panels 230 which allows the base to be filled with a growing medium and for supporting plant life, and are suitable for placing directly onto a roof, deck or patio surface in a modular green roof, deck and patio apparatus 100.

Figure 5:
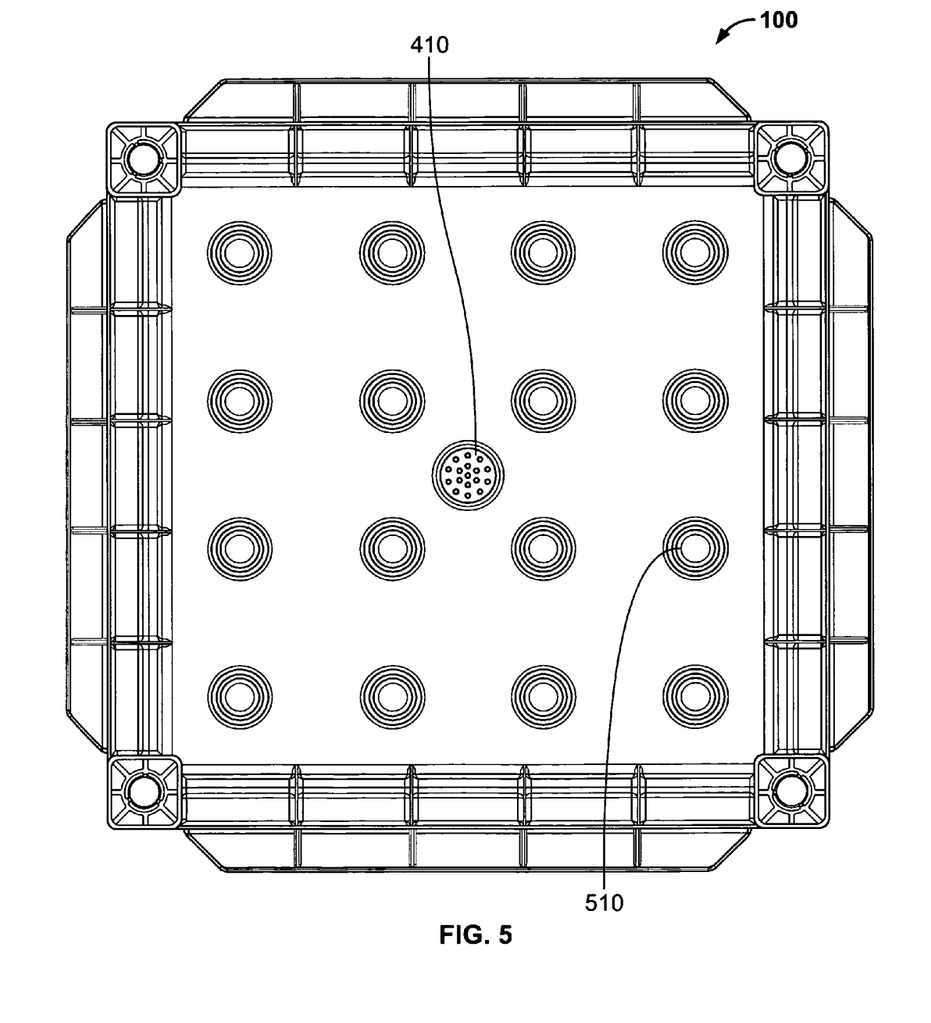
FIG. 5 is a bottom perspective view of a modular green roof, deck and patio apparatus in accordance with and incorporating the unique aspects of the present invention.

A structural design element 510 on the under-side of the base 200, as illustrated in FIG. 5, extending along the underside of the base 200 provides support and raises the floor of the base 200 above the roof, deck or patio surface to allow multi-directional free water flow, drainage and air flow on the roof, deck or patio surface under the base 200.

Drain holes 410 formed through the bottom of the base 210 as illustrated in FIGS. 4 and 5 provide water drainage of soil mass or other contents in the apparatus 100. The size and number of drain holes 410 in this area can be varied to provide the ideal amount of moisture content for the various types of plants and soil. An additional embodiment is to add a filter (not shown) into the drain hole 410 to provide water drainage without any soil erosion.

A webbing or netting may be placed onto the bottom of the base 210 prior to filling with the growing medium to prevent root growth into and through the drain hole 410 and onto the roof, deck or patio surface below the base 200.

As will be apparent, alternate base and modular panel embodiments, adapted for filling with a growing medium and plant life, and including alternate construction and connection means details, are also suitable for use in the green roof, deck or patio apparatus of the present invention as contemplated herein.

Accordingly, a green roof, deck or patio apparatus can be quickly and easily installed with the use of such bases and modular panel system by covering the roof, deck or patio surface, or the desired portion of the roof, deck or patio surface, with panels in side by side or design configuration layouts, the base and panel system being filled with desired growing materials.

Interconnecting Bases

Figure 6:
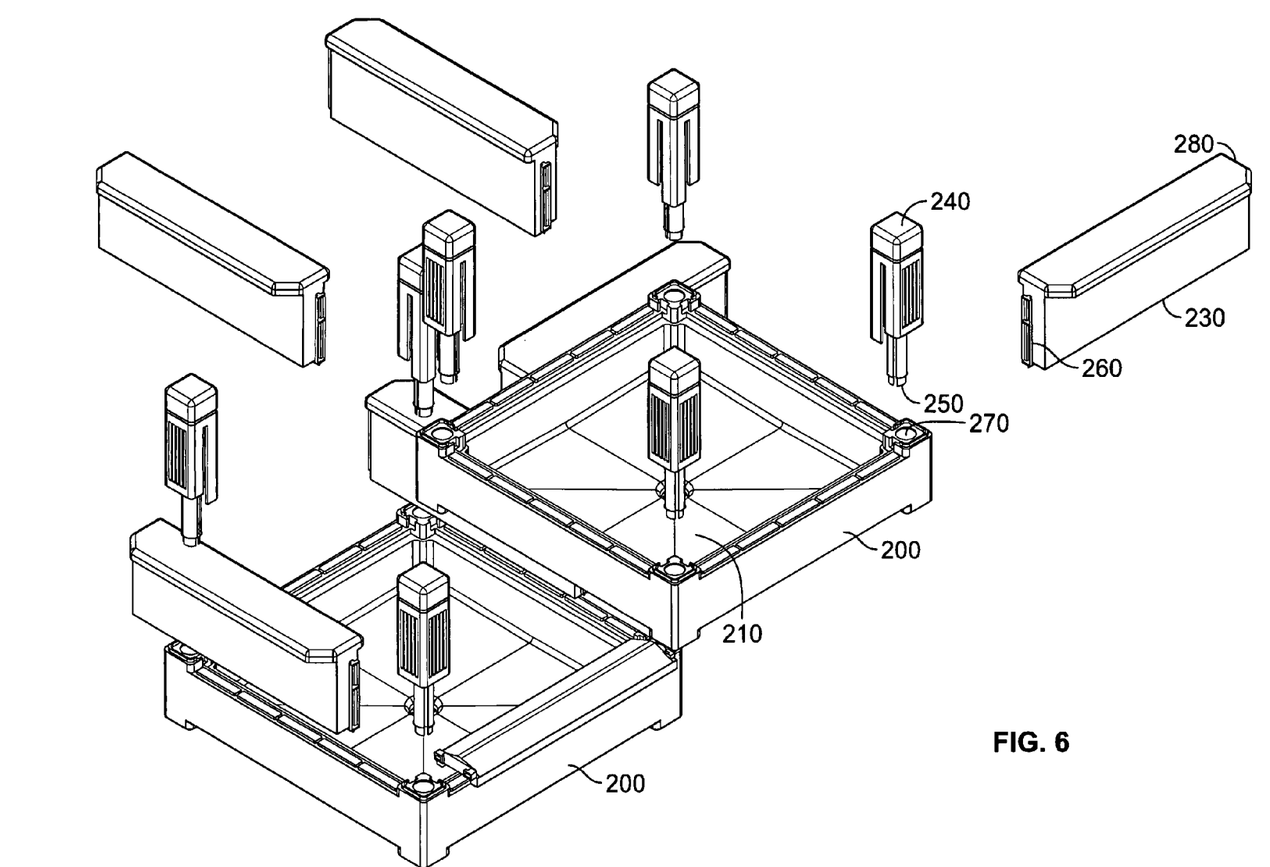
FIG. 6 is a full diagrammatic view of a modular green roof, deck and patio apparatus showing each individual component for a side by side configuration in accordance with and incorporating the unique aspect of the invention.

As illustrated in FIG. 6, in preferred embodiments, the bases 200 are provided for releasably connecting together. Such an arrangement is useful in providing a cohesive, wind resistant, non-shiftable green roof, deck and patio apparatus 100, and is particularly useful in connection with shallow, relatively light bases 200 to prevent high wind from lifting the bases 200 from the roof, deck or patio surface.

Figure 7:
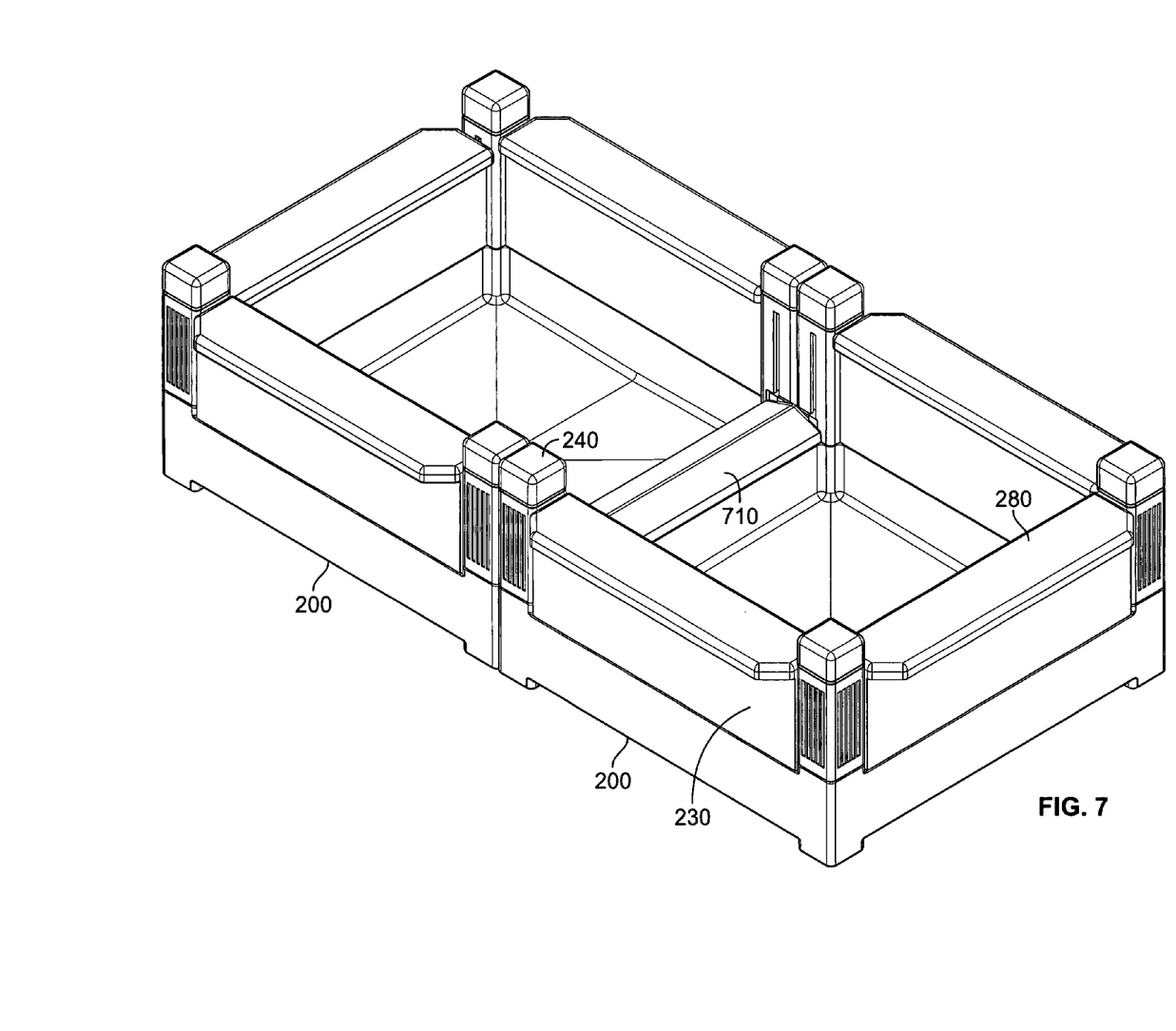
FIG. 7 is a side-by side design layout perspective view of interconnected modular green roof, deck and patio apparatuses in accordance with and incorporating the unique aspects of the present invention.
Figure 8:
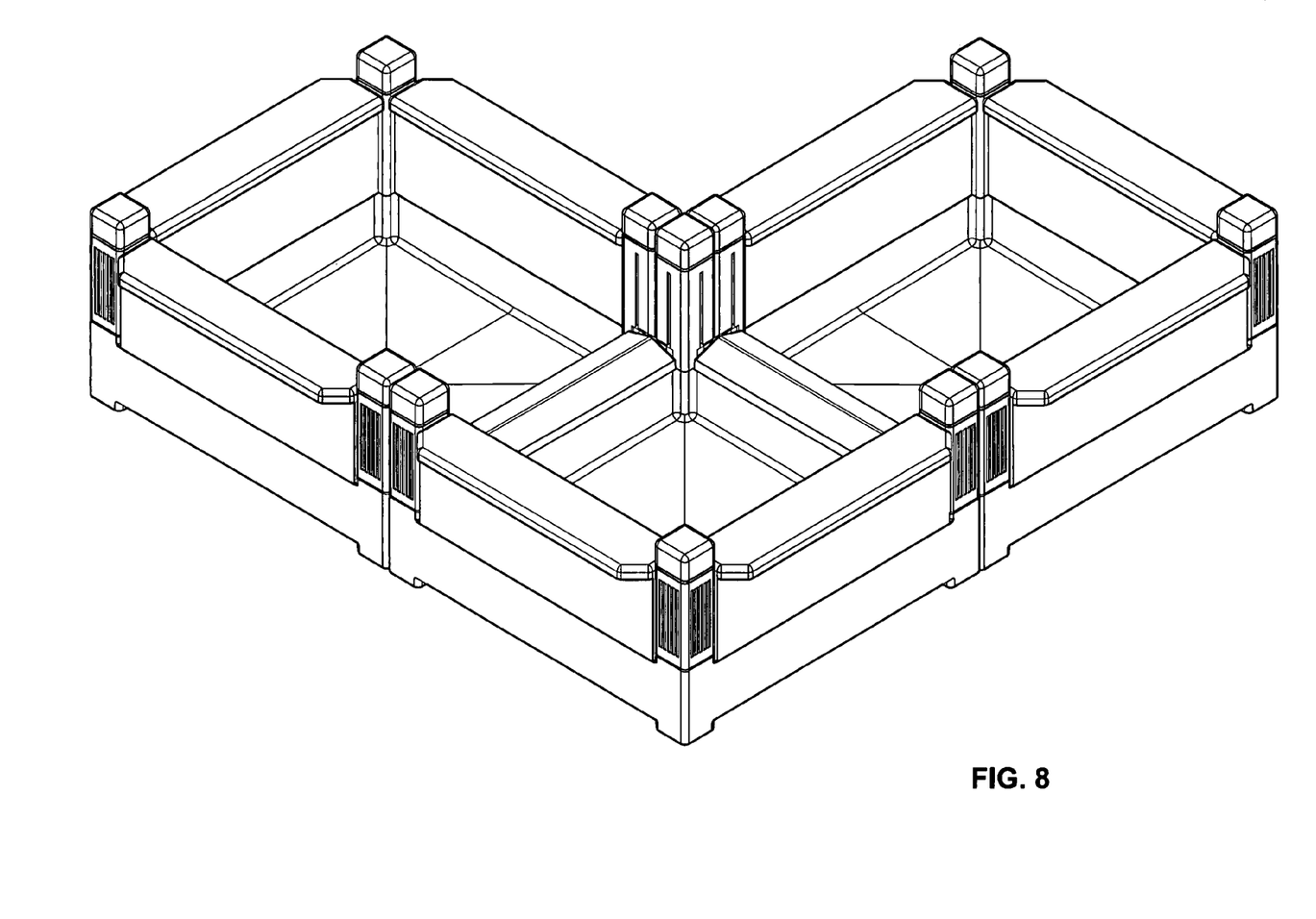
FIG. 8 is a "L" design layout perspective view of interconnected modular green roof, deck and patio apparatuses in accordance with and incorporating the unique aspects of the present invention.
Figure 9:
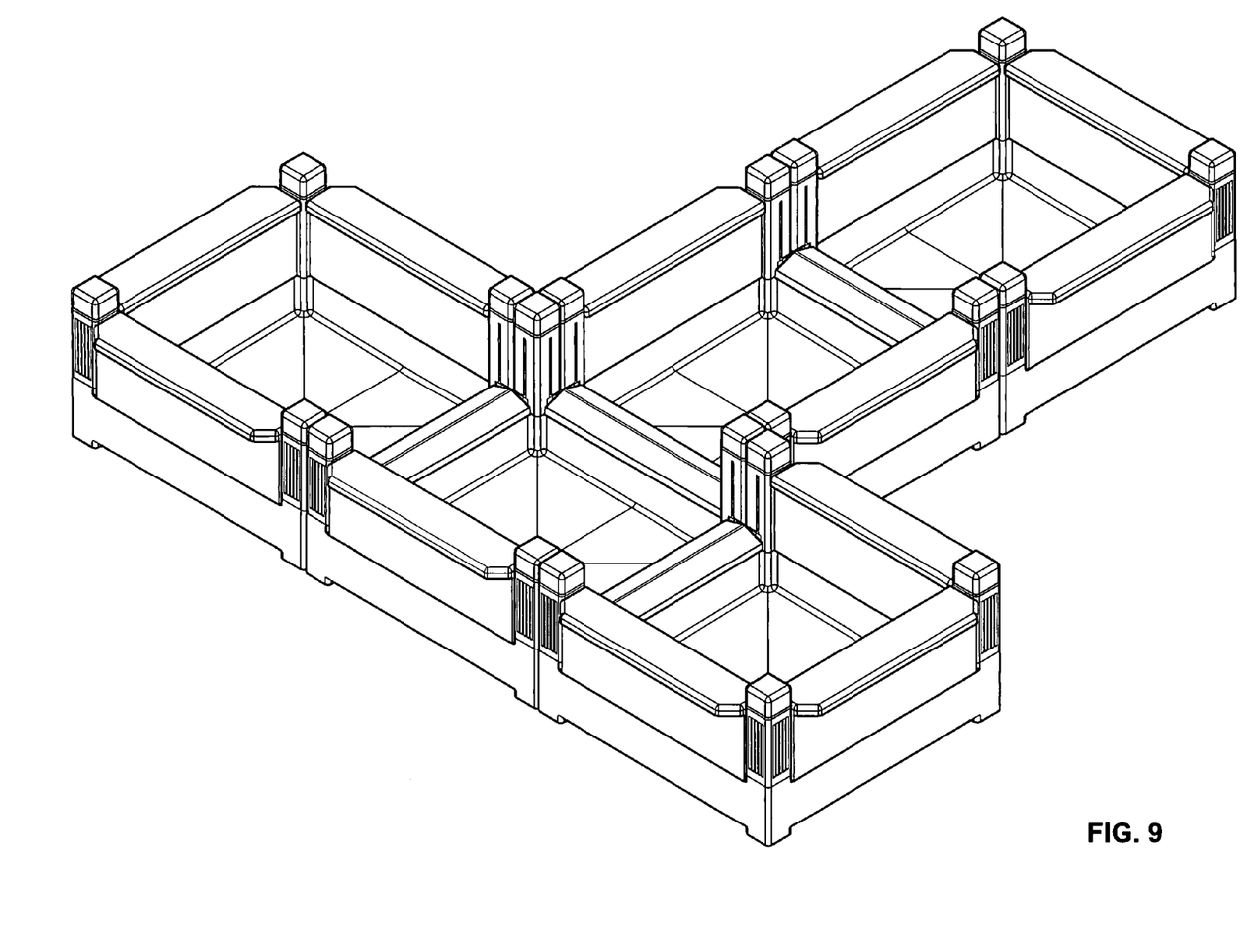
FIG. 9 is a "T" design layout perspective view of interconnected modular green roof, deck and patio apparatuses in accordance with and incorporating the unique aspects of the present invention.
Figure 10:
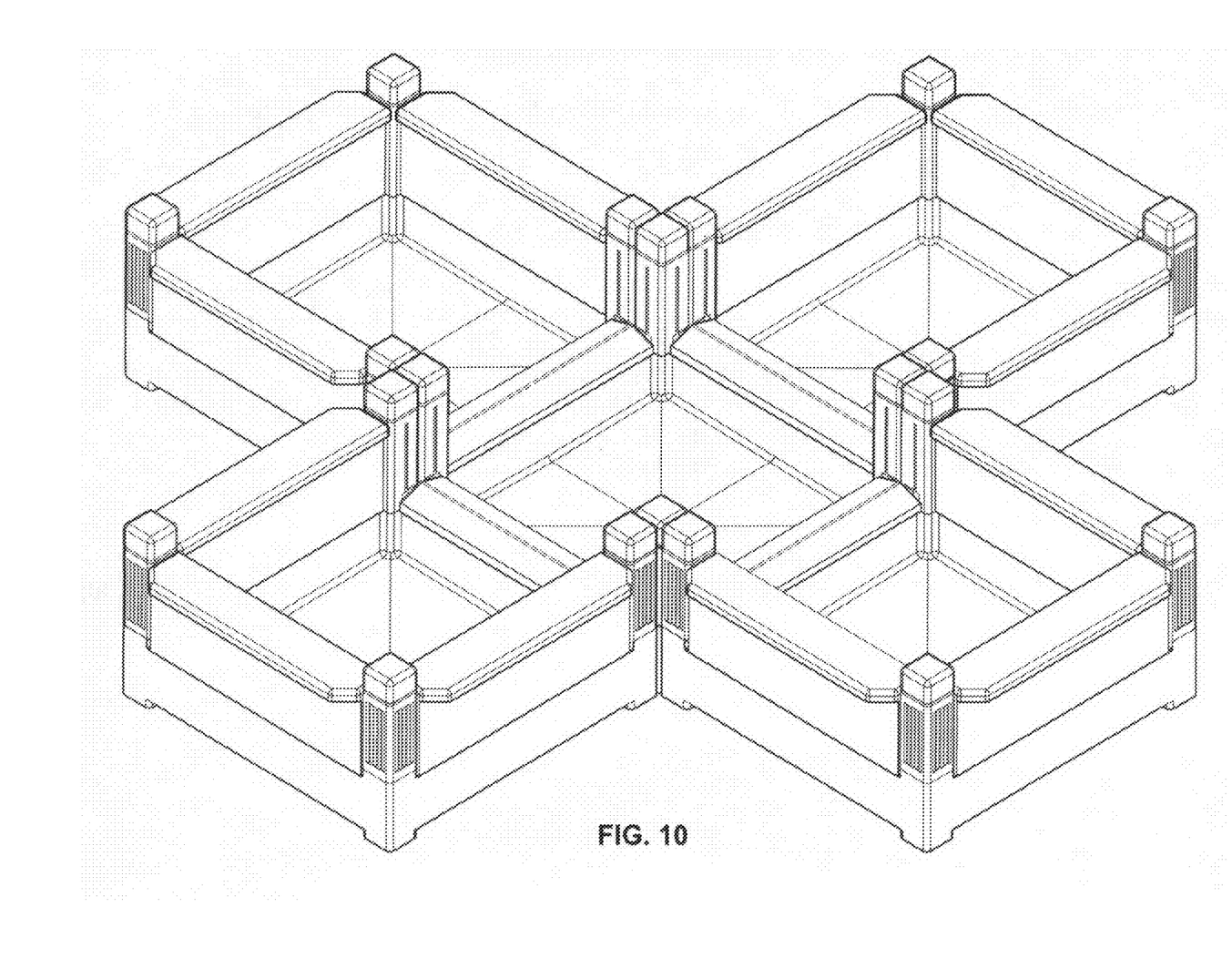
FIG. 10 is a "+" design layout perspective view of interconnected modular green roof, deck and patio apparatuses in accordance with and incorporating the unique aspects of the present invention.
Figure 11:
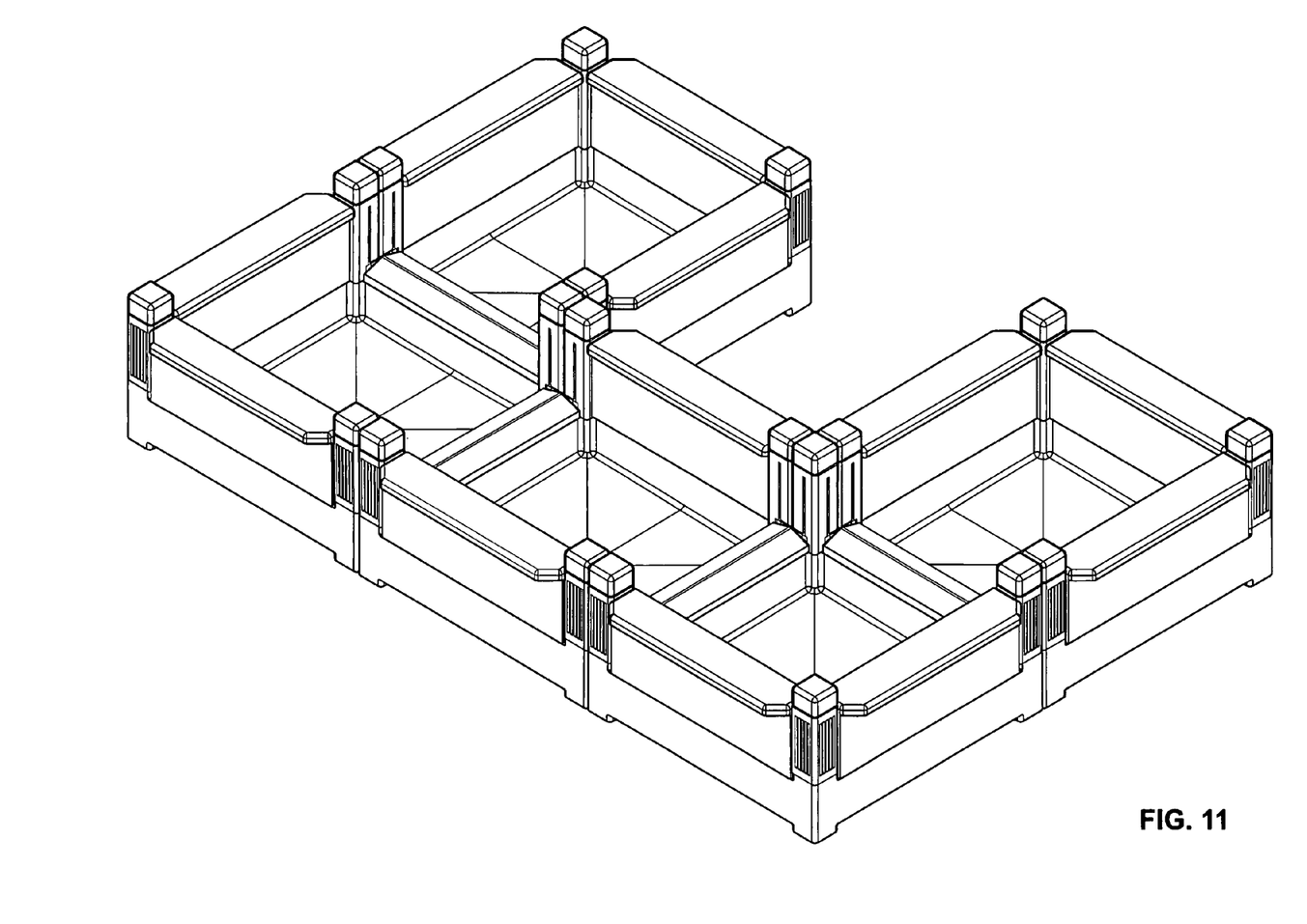
FIG. 11 is a "U" design layout perspective view of interconnected modular green roof, deck and patio apparatuses in accordance with and incorporating the unique aspects of the present invention.

In carrying out this aspect of the invention, in the embodiments shown, two bases 200 can be connected together by snap connection means with a water shed/connector 710, modular panels 230 and corner interlocking-posts 240, as illustrated in FIGS. 6 and 7. First, two bases 200 must be placed adjacent to each other on a flat roof, deck or patio surface. Second, a water shed/connector 710 is used to connect the adjacent sides of the two adjacent bases 200 together by a snap connection means through the ribs 220 located on the sides of the base 200. This locks the two adjacent bases 200 together while also creating a water shield. Third, modular panels 230 are connected to the remaining sides of the base 200 through a snap connection means using the ribs 220 located on the sides of the base 200. The panels 230 should stand vertical on top of the base 200. Fourth, a corner interlocking-post 240 is used to secure the sides of the panels 230 together and further secures the panels 230 to the base 200.

Each corner interlocking-post 240 has slots 290 located on two side faces of each post 240. These slots connect together with the ribs 260 on each side of each panel 230 creating a snap connection feature that locks the interlocking-post 240 to the panel 230. Moreover, each interlocking-post 240 has an extending member 250 which locks into the holes 270 located on each corner of each base 200. Once the panels 230 are connected to the base 200, on each corner the corner interlocking-post 240 slides in and connects to the sides of each panel 230 and connects to the base with snap connection features with the extending member 250 and hole 270. In one embodiment, the corner-interlocking posts 240 connects the perpendicular sides of the panels 230 together and further secures each panel 230 to the base 200.

Moreover, for the corners located at the shared wall when two adjacent bases 200 are connected (such as illustrated in FIG. 7), the water shed/connector 710 also has tabs on each end (not shown) which mate with the slots 290 of the corner interlocking posts 240.

Advantageously, this allows users to quickly assemble green spaces to their existing decks, roof and patio surfaces in a custom modular fashion without the use of tools. The average estimated time to assemble two modular roof, deck or patio apparatuses together is about 10 to about 15 minutes.

A further feature or benefit of assembling at least two modular roof, deck or patio apparatuses together is that the interior wall is removed which allows for lower cost and more continuous planting space.

Persons skilled in the art will appreciate alternate connectors or fasteners which may be used for releasably connecting the panels to the base and for releasably connecting adjacent bases together.

Additional Modular Components and Bounded Areas

The present invention also contemplates and accommodates additional modular components and bounded areas-providing for additional design freedom and flexibility. For example, the bases 200 may be releasably connected together for a side-by-side green roof, deck and patio apparatus 100 as illustrated in FIG. 7. As an additional embodiment, the bases 200 may be releasably connected together creating a "L" shaped (illustrated in FIG. 8), a "T" shaped (illustrated in FIG. 9), a "+" shaped (illustrated in FIG. 10), or a "U" shaped (illustrated in FIG. 11) green roof, deck and patio apparatus 100.

Support Framework for Additional Decorative and Functional Add-on Structures

Preferred green roof, deck and patio apparatuses 100 hereof are also provided with support add-on components suitable for use for decorative and/or functional purposes to compliment the modular aspects of the green roof, deck and patio apparatus 100.

Additional or add-on components may be temporary structures, or they may be semi-permanent structures and other desired above-panel structures that are maintained in the installed green roof, deck and patio apparatus.

In carrying out this aspect of the invention, as mentioned above, one embodiment of a suitable add-on component is provided by the addition of a ledge 280 for seating, such as illustrated in FIG. 2. The additional ledge 280 seating may be a temporary structure which is added on as a snap on feature to an existing modular panel 230 or a semi-permanent structure in which the additional ledge 280 seating is a built in feature of a modular panel 230. Advantageously, ledge 280 seating allows for easier accessibility to the planting area, and with the integral seats, makes gardening physically easier and provides further design flexibility.

Roof Deck or Patio Maintenance and Repair

Advantageously, the roof, deck or patio apparatus of the present invention is uniquely adapted for ease of maintenance and repair of both the roof, deck or patio apparatus itself and the underlying roof, deck or patio structure.

In accordance with another aspect of the invention, the green roof, deck or patio apparatus is provided for lifting and moving individual bases and panels, for installation of the roof, deck or patio system, and for lifting, removing and replacing individual bases or panels from an installed roof, deck or patio system, without the need to disturb surrounding bases and panels.

Advantageously, such a non-progressive arrangement, i.e., the ability to lift and move bases and panels from the installed green roof, deck and patio system without the need to disturb adjacent bases and panels, permits access to portions of the underlying roof, deck or patio surface such as for repair or periodic maintenance or access to drain openings without the need to tear-up and destroy large sections of the green roof, deck or patio systems as with prior systems, and provides the ability to change the green roof, deck or patio design after its initial installation by simply rearranging or replacing desired bases and panels.

From the foregoing, it will be apparent that the present invention brings to the art new and improved green roof, deck or patio systems and associated methods, including uniquely configured interlocking modular bases and panels and associated apparatus for use therewith.

We claim:

1. A modular green roof, deck or patio apparatus comprising:
    (a) one or more modular bases in a rectangular shape for resting on a roof, deck or patio surface so as to cover a predefined space on the roof, deck or patio surface,
    (b) each modular base having a bottom and sides extending upwardly therefrom to define a surrounded space for green roof, deck or patio materials,
    (c) the bottom of the base being formed with at least one drain hole therethrough and having an underside with a structural design element configured to permit water to flow under the base onto the roof, deck or patio surface,
    (d) adjacent sides of adjacent modular bases being complimentary to one another to permit lifting of a selected one of said modular panels from the roof, deck or patio surface without the need to lift or move the surrounding modular bases,
    (e) the sides being releasably connected to modular panels surrounding the perimeter thereof,
    (f) a water shed/connector system between adjacent sides of adjacent bases to close the space therebetween and for connecting the adjacent sides of adjacent bases together and also creating a water barrier,
    (g) a corner connection system between perpendicular sides of the panels to close the space therebetween and for connecting the panels together and for locking the panels onto the base wherein the corner connection system includes an inter-locking post which further includes a slot on at least two side faces of each post wherein the slots are releasably connected to sides of the panels by mating with a rib located on each side of each panel.

2. The modular green roof, deck or patio apparatus of claim 1 wherein the sides are releasably connected to the modular panels with a snap connection feature wherein the sides include ribs which mate with openings on the underside of each panel.

3. The modular green roof, deck or patio apparatus of claim 1 wherein the corner connection system includes an inter-locking post which further includes an extending member which extends downwardly from the underside of the post and releasably snap fits into a hole positioned at the corner edges of the base.

4. The modular green roof, deck or patio apparatus of claim 1 wherein adjacent sides of adjacent bases are releasably connected together by a water shed/connector wherein the sides are releasably connected to the water shed/connector with a snap connection feature wherein the sides include ribs which mate with openings on the underside of water shed/connector.

5. The modular green roof, deck or patio apparatus of claim 1 wherein the corner connection system includes an inter-locking post which further includes a slot on at least two side faces of each post wherein the slots are releasably connected to a tab located at each end of the water shed/connector.

6. The modular green roof, deck or patio apparatus of claim 1 wherein when at least two apparatuses are releasably connected together there is no panel located at the adjacent wall which allows for more continuous planting space and lower cost.

7. The modular green roof, deck or patio apparatus of claim 1, wherein a filter may be added into the drain hole to provide water drainage without soil erosion.

8. The modular green roof, deck or patio apparatus of claim 1, wherein the modular bases and panels are lightweight and convenient for handling and are properly sized to fit into an average sized car for easy transportation.

9. The modular green roof, deck or patio apparatus of claim 1, wherein the modular bases and panels are made of plastic and/or plastic composite.

10. The modular green roof, deck or patio apparatus of claim 1, wherein the modular bases and panels may be placed in multiple desired aesthetic design layouts, such as in a side by side placement, a "L" placement, a "T" placement, a "+" placement, or a "U" placement.

11. The modular green roof, deck or patio apparatus of claim 1 wherein the panel may include a ledge which may be utilized as seating to allow easier accessibility to the planting area.

12. The modular green roof, deck or patio apparatus of claim 1 wherein the predefined space may be used for the purposes of gardening such as growing perennials, vegetation, and the like.

* * * * *